(12) United States Patent
Filippi et al.

(10) Patent No.: US 10,464,818 B2
(45) Date of Patent: Nov. 5, 2019

(54) PROCESS FOR PRODUCING AMMONIA SYNTHESIS GAS

(71) Applicant: Casale SA, Lugano (CH)

(72) Inventors: Ermanno Filippi, Castagnola (CH); Marco Badano, Lugano-Besso (CH); Geoffrey Frederick Skinner, Reading (GB)

(73) Assignee: Casale SA, Lugano-Besso (CH)

( * ) Notice: Subject to any disclaimer, the term of this patent is extended or adjusted under 35 U.S.C. 154(b) by 0 days.

(21) Appl. No.: 15/637,547

(22) Filed: Jun. 29, 2017

(65) Prior Publication Data

US 2018/0072580 A1 Mar. 15, 2018

Related U.S. Application Data

(63) Continuation of application No. 14/562,188, filed on Dec. 5, 2014, now abandoned, which is a continuation
(Continued)

(30) Foreign Application Priority Data

Aug. 8, 2007 (EP) ..................................... 07015647

(51) Int. Cl.
*C01C 1/04* (2006.01)
*C01B 3/02* (2006.01)
(Continued)

(52) U.S. Cl.
CPC ............ *C01C 1/0441* (2013.01); *C01B 3/025* (2013.01); *C01B 3/382* (2013.01); *C01B 3/384* (2013.01);
(Continued)

(58) Field of Classification Search
None
See application file for complete search history.

(56) References Cited

U.S. PATENT DOCUMENTS 3,264,066 A 8/1966 Quartulli et al.
3,442,613 A 5/1969 Grotz, Jr.
(Continued)

FOREIGN PATENT DOCUMENTS

GB 1270756 A 4/1972

OTHER PUBLICATIONS

Zhavoronkov, N.M., "Spravochnik Azotchika", Moscow, Chemistry, 1986, pp. 83-84, and translation of same.

*Primary Examiner* — Anthony J Zimmer
(74) *Attorney, Agent, or Firm* — Akerman LLP

(57) ABSTRACT

A process for producing ammonia synthesis gas from the reforming of hydrocarbons with steam in a primary reformer (1) equipped with a plurality of externally heated catalytic tubes and then together with air in a secondary reformer (2) is characterized in that the reaction of said hydrocarbons with said steam in said primary reformer (1) is performed at an operating pressure of more than 35 bar in the catalytic tubes, in that air is added to said secondary reformer in excess over the nitrogen amount required for ammonia synthesis and in that the excess of nitrogen is removed downstream the secondary reformer preferably by cryogenic separation or by molecular sieves of the TAS or PSA type. This process allows to obtain high synthesis gas production capacities and lower investment and energy costs.

9 Claims, 2 Drawing Sheets

Related U.S. Application Data of application No. 13/587,632, filed on Aug. 16, 2012, now abandoned, which is a continuation of application No. 12/672,201, filed as application No. PCT/EP2008/005903 on Jul. 18, 2008, now abandoned.

(51) Int. Cl.
| | |
|---|---|
| *C01B 3/38* | (2006.01) |
| *C01B 3/48* | (2006.01) |
| *C01B 3/50* | (2006.01) |
| *C01B 3/52* | (2006.01) |
| *C01B 3/56* | (2006.01) |
| *C01B 3/58* | (2006.01) |

(52) U.S. Cl.
CPC ............... *C01B 3/48* (2013.01); *C01B 3/506* (2013.01); *C01B 3/52* (2013.01); *C01B 3/56* (2013.01); *C01B 3/586* (2013.01); *C01B 2203/0233* (2013.01); *C01B 2203/0244* (2013.01); *C01B 2203/0283* (2013.01); *C01B 2203/042* (2013.01); *C01B 2203/043* (2013.01); *C01B 2203/046* (2013.01); *C01B 2203/047* (2013.01); *C01B 2203/0415* (2013.01); *C01B 2203/0445* (2013.01); *C01B 2203/0475* (2013.01); *C01B 2203/0495* (2013.01); *C01B 2203/068* (2013.01); *C01B 2203/1241* (2013.01); *C01B 2203/142* (2013.01); *C01B 2203/143* (2013.01); *C01B 2203/147* (2013.01)

(56) References Cited

U.S. PATENT DOCUMENTS

| | | | |
|---|---|---|---|
| 4,296,085 A | | 10/1981 | Banquy |
| 4,298,588 A | * | 11/1981 | Pinto .................. C01B 3/025 |
| | | | 423/359 |
| 4,409,196 A | * | 10/1983 | Skinner .............. C01B 3/025 |
| | | | 252/373 |
| 4,414,191 A | | 11/1983 | Fuderer |
| 4,592,860 A | | 6/1986 | Fuderer |
| 4,613,492 A | * | 9/1986 | Winter .................. C01B 3/025 |
| | | | 252/374 |
| 4,681,745 A | * | 7/1987 | Pinto .................. C01B 3/025 |
| | | | 423/359 |
| 4,725,380 A | | 2/1988 | Pinto |
| 4,728,506 A | * | 3/1988 | Habermehl ............. C01B 3/025 |
| | | | 423/359 |
| 4,846,851 A | * | 7/1989 | Guro .................... C01B 3/025 |
| | | | 95/100 |
| 5,006,131 A | * | 4/1991 | Karafian ................ B01J 8/062 |
| | | | 422/201 |
| 7,309,378 B2 | | 12/2007 | Bancon et al. |
| 7,470,415 B2 | | 12/2008 | Davey et al. |
| 2004/0234426 A1 | * | 11/2004 | Reddy .................. C01B 3/025 |
| | | | 422/148 |
| 2006/0198781 A1 | | 9/2006 | Filippi et al. |
| 2006/0239871 A1 | | 10/2006 | Malhotra et al. |

\* cited by examiner

PROCESS FOR PRODUCING AMMONIA SYNTHESIS GAS

CROSS-REFERENCE TO RELATED APPLICATIONS

This application is a continuation of U.S. patent application Ser. No. 14/562,188, filed Dec. 5, 2014, which is a continuation of U.S. patent application Ser. No. 13/587,632, filed Aug. 16, 2012, which is a continuation of U.S. patent application Ser. No. 12/672,201, filed Feb. 4, 2010, which is a national phase of PCT/EP2008/005903, filed Jul. 18, 2008, which claims priority to European Patent Application No. 07015647.6 filed Aug. 8, 2007, the disclosures of which are hereby incorporated by reference in their entirety.

FIELD OF APPLICATION

In its most general aspect, the present invention concerns the preparation of synthetic gas mixtures required for the manufacture of ammonia.

In particular, the present invention concerns a process for producing ammonia synthesis gas comprising hydrogen (H2) and nitrogen (N2) obtained from the reforming of hydrocarbons.

The present invention also concerns a process for ammonia production from synthesis gas obtained from the reforming of hydrocarbons.

Throughout this specification and the appended claims, the term "hydrocarbons" is used to indicate generally a raw material source of hydrogen and carbon, such as for example methane, natural gas, naphtha, GPL (liquefied petroleum gas) or refinery gas and mixtures thereof.

As known, in the field of synthesis gas production, more and more the need is felt of realizing processes which are easy to implement and allow to reach higher and higher production capacities with low operating and investment costs and low energy consumption.

PRIOR ART

As it is well known in the art, the production of synthesis gas for ammonia is mainly performed by a combined reforming process in which desulphurized hydrocarbons are mixed with steam in a suitable ratio and the resulting mixture is admitted at a primary reformer in which most of the hydrocarbons in the feed are steam reformed (converted) into a mixture of carbon monoxide, carbon dioxide and hydrogen by passage over a suitable catalyst at moderate pressures, in the range of 15 to 35 bar, and high temperatures in the range of 780° C. to 820° C.

As said conversion is endothermic, the catalyst is contained in a multiplicity of catalytic tubes which are heated externally by the heat of reaction supplied by the combustion of a gaseous fuel with air.

The gas product exiting the primary reformer is fed to a secondary reformer usually containing a suitable catalyst in a catalytic bed and a reaction space overlying the catalytic bed, the secondary reformer also receiving a flow of air in a controlled amount to supply the nitrogen required for the downstream ammonia synthesis.

The oxygen reacts in the reaction space above the catalyst bed with the combustible components of the product gas coming from the primary reformer and the resulting combined product gas enters the catalyst bed at elevated temperature.

During passage down through the catalyst, the residual methane reacts endothermically with steam, resulting in a typical exit temperature of the secondary reformer outlet gas of around 1000° C. with over 99% of the hydrocarbons feed converted to carbon oxides and hydrogen.

The reformed gas exiting the secondary reformer is then typically treated in a series of down-stream equipments to remove carbon oxides and obtain a gas composition suitable for ammonia synthesis (i.e. having a H2/N2 molar ratio close to 3:1). These equipments include:

CO shift converters in which most of the carbon monoxide content (CO) of the reformed gas is catalytically converted with unreacted steam to carbon dioxide plus an additional volume of hydrogen, CO2 washing column in which the carbon dioxide content is almost completely removed by scrubbing the gas with an appropriate solvent such as an aqueous solution of an amine or of potassium carbonate, so obtaining a gas flow comprising nitrogen and hydrogen in an approximately 3:1 H2/N2 molar ratio and traces of methane, carbon oxides and argon, Methanator reactor in which the residual carbon oxides are catalytically converted to methane to avoid poisoning of the downstream ammonia synthesis catalyst by those oxygen-containing compounds.

In this way, a final ammonia synthesis gas at low pressure is obtained (typically 15-25 bar) which needs to be compressed to the pressure required for ammonia synthesis, this pressure being generally in the range of 80 to 300 bar, typically around 150 bar, according to the ammonia synthesis process to be used.

Although advantageous on several aspects, the ammonia synthesis gas process described above suffers the recognized drawback that it is difficult to implement in large-capacity ammonia plants.

In this case, the main difficulty is that of designing and manufacturing an appropriate compressor and its turbine for compressing the very high synthesis gas flow required for large-capacity ammonia plants from its low pressure to the high pressure required for ammonia synthesis.

In addition, for large capacity ammonia plants, the other equipments and pipework are required to be of a very large size at the operating conditions (in particular pressure) of the synthesis gas process described above. However, this would increase too much both investment and energy costs and consequently the synthesis gas production capacity is limited.

SUMMARY OF THE INVENTION

The problem underlying the present invention is to provide a process for producing synthesis gas suitable for ammonia production which is easy to implement and allows to obtain high production capabilities with low operating and investments costs as well as with low energy consumption.

This problem is solved by a process for producing ammonia synthesis gas, characterized in that it comprises the steps of:

feeding a gas flow comprising hydrocarbons and a gas flow comprising steam to a primary reformer equipped with a plurality of externally heated catalytic tubes, reacting said hydrocarbons with said steam in the catalytic tubes of said primary reformer at an operating pressure of more than 35 bar in the catalytic tubes, obtaining a product gas, feeding said product gas and a flow of air to a secondary reformer, said air being added in excess over the nitrogen amount required for ammonia synthesis for substantially reforming all the hydrocarbons content of said product gas exiting the primary reformer, subjecting said product gas to reaction with said air and then to secondary reforming, obtaining a reformed gas comprising nitrogen in excess over the amount required for ammonia synthesis, hydrogen, carbon oxides and unreacted steam, removing carbon oxides and excess nitrogen from said reformed gas, obtaining said synthesis gas.

The term "product gas" as used herein indicates a partially reformed gas as obtained for example at the outlet of the primary reformer or in the reaction space of the secondary reformer which normally comprises carbon oxides (CO and CO2), hydrogen (H2), steam and unconverted hydrocarbons.

The term "synthesis gas" as used herein indicates a gas comprising N2 and H2 in a appropriate molar ratio for ammonia synthesis, that is to say that said gas has a N2/H2 corresponding or close to the stoichiometric 1:3 molar ratio. The term "reformed gas" as used herein indicates a fully reformed gas as obtained for example at the outlet of the secondary reformer which normally comprises nitrogen, hydrogen, carbon oxides and unreacted steam and possibly traces of unconverted hydrocarbons.

The present invention is based on the finding that it is possible to obtain a ammonia synthesis gas at high pressure and at the same time with high production capacities by increasing the operating pressure in the catalytic tubes of the primary reformer to more than 35 bar and by supplying an excess of air to the secondary reformer (which also produces an excess of nitrogen over the amount required in the final synthesis gas for ammonia synthesis) to fully convert (re-form) the hydrocarbons contained in the product gas exiting the primary reformer.

This finding is in sharp contrast with the constant teaching of the prior art according to which in order to obtain high production capacities of ammonia synthesis gas it is necessary to have equipments (in particular compressor) and pipework of the related plant of very large size.

Surprisingly, according to the process of the invention, the feasible increase in pressure is particularly large as it is possible for instance to substantially double the operating pressure in the catalytic tubes compared to the prior art processes (to obtain an operating pressure of 60 bar for instance) without the need of changing the design of the tubes currently used in the primary reformer.

According to the invention, the operating pressure in the catalytic tubes of the primary reformer is in the range of 40-100 bar, most preferably in the range of 60-80 bar.

Preferably, in order to avoid a possible reduction of the tubes lifetime under the new operating pressures of the invention, it has been found useful to heat the tubes in such a way to obtain a outlet temperature not exceeding 750° C. (preferably 650-750° C.) for the product gas exiting said tubes.

The choice of the outlet temperature from the tubes depends on the operating pressure within the tubes and it decreases as the operating pressure increases so as to maintain a high tube lifetime.

For instance, in the case of catalytic tubes of conventional internal diameter of around 100 mm and wall thickness of 10-12 mm which are operated, according to the invention, at 60 bar pressure/750° C. outlet temperature, it has been found that the tubes shows a very good lifetime of around 100,000 hours.

Furthermore, the final synthesis gas is obtained by the process according to the invention with a high pressure and this allows to employ smaller equipment and piping downstream the reformers, so reducing both investment an energy costs.

In particular, it is possible to employ smaller and less expensive equipments for compressing the final synthesis gas to the pressure required for conversion into ammonia in a synthesis loop of a ammonia plant. In addition, the energy required for this compression is reduced as the final synthesis gas is already obtained with a high pressure at the outlet of the reforming process. Therefore, a reduction of the energy consumption in a ammonia plant employing high pressure synthesis gas obtained according to the invention can also be achieved.

In accordance with a preferred aspect of the process according to the invention, said excess of air is comprised in the range of 15% to 100%, preferably 20% to 40%, over the amount of air necessary to produce the nitrogen content required for ammonia synthesis.

The use of excess air allows to effectively convert the hydrocarbons (in particular methane) contained in the primary reformer outlet gas (the hydrocarbon content being increased as a result of both the increased pressure and reduced temperature in the primary reformer) in the space above the catalytic bed of the secondary reforming to produce carbon oxides and steam, so obtaining a product gas at elevated temperature.

Then, such product gas passes through the catalytic bed of the secondary reformer where endothermically reforming reaction occurs (exploiting the heat content of said product gas) which substantially completes the reforming process so achieving advantageously a overall hydrocarbon conversion yield which is fully comparable with that of the prior art reforming processes.

According to another aspect of the present invention, said step of removing carbon oxides and said excess nitrogen from said reformed gas comprises the following operative stages:

substantially removing carbon monoxide from said reformed gas by catalytic conversion with some unreacted steam into carbon dioxide and hydrogen, so obtaining a reformed gas essentially deprived of carbon monoxide and some steam, substantially removing carbon dioxide by scrubbing said reformed gas essentially deprived of carbon monoxide and some steam with a suitable solution or solvent, so obtaining a reformed gas still including traces of carbon oxides.

removing said traces of carbon oxides from said reformed gas containing them by catalytic conversion to methane, obtaining a reformed gas deprived of carbon oxides, removing excess nitrogen from said reformed gas deprived of carbon oxides by cryogenic separation.

According to another aspect of the present invention, said step of removing carbon oxides and said excess nitrogen from said reformed gas comprises the following operative stages:

substantially removing carbon monoxide from said reformed gas by catalytic conversion with some unreacted steam into carbon dioxide and hydrogen, so obtaining a reformed gas essentially deprived of carbon monoxide and some steam, substantially removing carbon dioxide by scrubbing said reformed gas essentially deprived of carbon monoxide and some steam with a suitable solution or solvent, so obtaining a reformed gas still including traces of carbon oxides, removing said traces of carbon oxides and said excess nitrogen by passing said reformed gas still including traces of carbon oxides through a molecular sieve of the PSA or TSA type.

The term "molecular sieves" as used herein includes all materials having micropores suitable to preferentially adsorb nitrogen and carbon oxides from a gas mixture containing them. According to the procedure of adsorption and release of nitrogen and carbon oxides, these materials are classified as PSA (pressure swing adsorption) molecular sieves or TSA (temperature swing adsorption) molecular sieves.

According to the PSA procedure, the gaseous mixture containing nitrogen and traces of carbon oxides is allowed to pass through the PSA molecular sieve under pressure, thereby obtaining a preferential adsorption of nitrogen and carbon oxides in the micropores of the molecular sieve. Then, the pressure is reduced to de-adsorb nitrogen and carbon oxides from the micropores, thereby regenerating the molecular sieve.

Differently, according to the TSA procedure, the nitrogen and carbon oxides adsorption is obtained by passing the gaseous mixture containing them through the TSA molecular sieve at a prefixed temperature. Then, the temperature is increased, for example through a flow of steam or hot water, so as to de-adsorb nitrogen and carbon oxides from the micropores, thereby regenerating the molecular sieve.

The present invention also concerns a process for producing ammonia from gas synthesis comprising the steps of:

feeding a gas flow comprising hydrocarbons and a gas flow comprising steam to a primary reformer equipped with a plurality of externally heated catalytic tubes, reacting said hydrocarbons with said steam in the catalytic tubes of said primary reformer at an operating pressure of more than 35 bar in the catalytic tubes, obtaining a product gas, feeding said product gas and a flow of air to a secondary reformer, said air being added in excess over the nitrogen amount required in the final synthesis gas for ammonia synthesis for substantially reforming all the hydrocarbons content of said product gas exiting the primary reformer, subjecting said product gas to reaction with said air and then to secondary reforming, obtaining a reformed gas comprising nitrogen in excess over the amount required for ammonia synthesis, hydrogen and carbon oxides, removing carbon oxides and excess nitrogen from said reformed gas, obtaining said synthesis gas, and feeding said synthesis gas to a ammonia synthesis loop and reacting it under conditions effective to obtain ammonia.

The characteristics and advantages of the invention will further result from the following description of an embodiment thereof given by way of non limiting example with reference to the attached drawing.

DETAILED DESCRIPTION OF A PREFERRED EMBODIMENT

Figure 1:
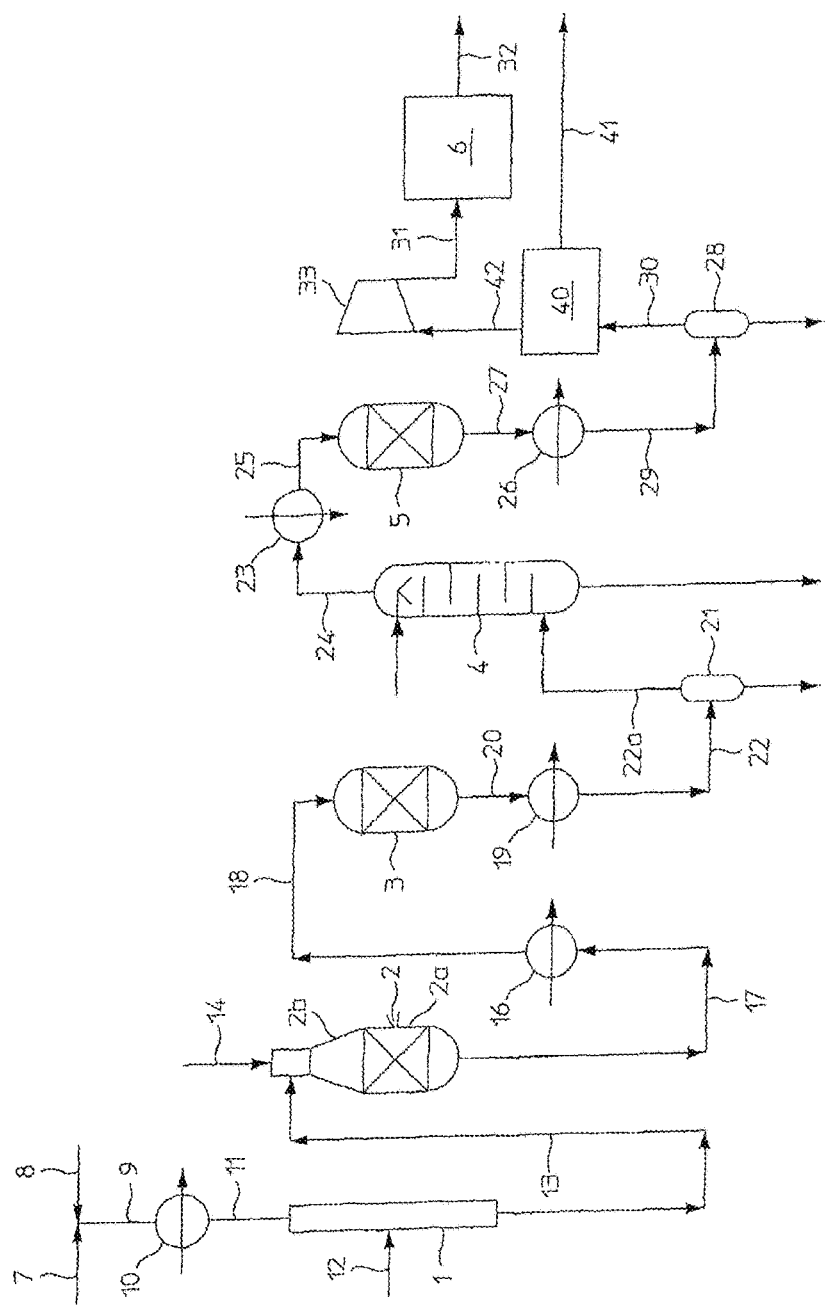
FIG. 1 shows schematically a plant for producing ammonia synthesis gas according to an embodiment of the present invention, said plant being shown in fluid communication with a ammonia synthesis loop of a ammonia plant.

In FIG. 1, a plant is shown schematically that illustrates the process steps according to the present invention for producing ammonia synthesis gas through primary and secondary reforming of a gaseous flow comprising hydrocarbons. In the process illustrated hereafter, the raw material employed as a source of hydrocarbons consists of natural gas.

With reference to FIG. 1, reference number 1 indicates a primary reformer, reference number 2 indicates a secondary reformer, reference number 3 indicates a series of CO shift converters (which only one is shown of), reference number 4 indicates a CO2 washing column, reference number 5 indicates a methanator and block 6 indicates a ammonia synthesis loop of a ammonia plant.

The low line 7 indicates a gas flow of natural gas which has been previously deprived of sulphur in a conventional manner and the flow line 8 indicates a flow gas of steam.

The desulphurized natural gas flow 7 is mixed with the steam flow 8 in a ratio of approximately 2.5 to 5 mols of steam per mol of carbon in natural gas and the resulting mixture is fed, through the flow line 9, to a heat exchanger 10, where it is pre-heated to a temperature of around 500° C. and the pre-heated mixture is fed, through the flow line 11 to the primary reformer 1.

The primary reformer 1 comprises internally a plurality of tubes (not shown) filled with a suitable catalyst, per se conventional, which are externally heated through a thermal exchange fluid indicated by the flow line 12.

According to the present invention, the catalytic tubes in the primary reformer are heated so as to have a outlet temperature from the tubes in the range of 650-750° C. while the gas mixture comprising hydrocarbons and steam fed to the primary reformer 1 enters the tubes to an operating pressure of about 60 bar.

In addition, in the present example, all the natural gas feed is supplied to the primary reformer 1.

The product gas exiting the primary reformer 1 at a temperature of 650-750° C. and a pressure of around 60 bar, is supplied, through the flow line 13, to the secondary reformer 2 which also receives an oxidant flow gas consisting of air supplied through the flow line 14.

According to the invention, the air is supplied to the secondary reformer 2 in excess over the nitrogen amount required in the final synthesis gas for ammonia synthesis, to compensate the increased hydrocarbon content in the product gas exiting the primary reformer, as a result of using both an increased pressure and a reduced temperature with respect to the prior art.

The secondary reformer 2 includes, in this example, a catalytic bed 2a of a suitable catalyst (for example a nickel-based catalyst) and a overlying reaction space 2b. The oxygen fed to the secondary reformer 2 (through air) reacts with the product gas exiting the primary reformer 1 in the reaction space 2b to produce a second gas product at elevated temperature.

Then, such a second product gas passes through the catalytic bed 2a of the secondary reformer where endothermically reforming reaction occurs (exploiting the heat content of said second product gas) which substantially completes the reforming process, so obtaining a reformed gas comprising nitrogen (in excess), hydrogen, carbon oxides and residual steam.

According to an alternative embodiment (not shown), the secondary reformer 2 may be free of catalytic bed 2a. In this case, it will include one or more reaction spaces, as the reaction space 2b indicated above, for carrying out and completing the reforming process.

The final reformed gas exiting the secondary reformer 2 has a temperature of around 1000° C. and a pressure of around 60 bar. It is supplied first to a heat exchangers 16, through the flow line 17, where it is cooled to a temperature of around 350° C. and then to a series (normally two) of CO shift converters 3, through the flow line 18.

In the CO shift converters 3, the carbon monoxide content of the reformed gas is catalytically converted with unreacted steam to carbon dioxide plus and additional volume of hydrogen. The outlet condition from the last (second) CO shift converter 3 is around 220° C. with at least 98% of the inlet CO converted. The reformer gas exiting the last CO shift converter 3 is fed to a heat exchanger 19 (through the flow line 20) where it is cooled to near ambient temperature and the cooled gas is fed to a separator 21 (through the flow line 22) for separation of condensate.

The gas leaving the separator 21 flows, through the flow line 22a, to a CO2 washing column 4 in which most of the carbon dioxide content is almost completely removed by scrubbing with a appropriate solvent such as an aqueous solution of an amine or of potassium carbonate. The outlet gas flow from the top of the column 4 consists essentially of hydrogen and nitrogen in excess with traces of hydrocarbons (methane) and carbon oxides.

This gas is fed, through the flow line 24, to a heat exchanger 23, where it is heated to a temperature of around 300° C., and then to the methanator reactor 5 through the flow line 25. The methanator reactor 5 contains a bed of an appropriate catalyst, for example a nickel-based catalyst, for converting the traces of carbon oxides to methane so avoiding poisoning of the down-stream ammonia synthesis catalyst by these oxygen-containing compounds.

The gas exiting the methanator reactor 5 is cooled in a heat exchanger 26, in which it is fed through the flow line 27, and the cooled gas is fed to a separator 28, through the flow line 29, for separating condensate.

The gas exiting the separator 28 is then fed through the flow line 30 to a cryogenic separator 40 where nitrogen in excess over the amount required for ammonia synthesis is separated (removed) together with most of the methane obtained in the methanator reactor 5 and some hydrogen, so obtaining a ammonia synthesis gas comprising nitrogen and hydrogen in an appropriate molar ratio for ammonia synthesis (i.e. a H2/N2 molar ratio corresponding or close to 3:1) and a separated gas.

The separated gas is recovered from the cryogenic separator 40 through the flow line 41 and normally used as supplementary fuel while the ammonia synthesis gas is fed to a compressor 33 (through the flow line 42) where it is compressed to the pressure required for ammonia synthesis for example 150 bar.

Since, according to the present invention, the ammonia synthesis gas is obtained with a higher pressure than the prior art (in this example around 60 bar), lower installation and operating costs are advantageously obtained in connection with the compressor 33.

Finally, the compressed synthesis gas is supplied to the synthesis loop 6, through the flow line 31, where it is reacted in conditions effective to produce ammonia. The ammonia so obtained is discharged from the synthesis loop 6 through the flow line 32.

Figure 2:
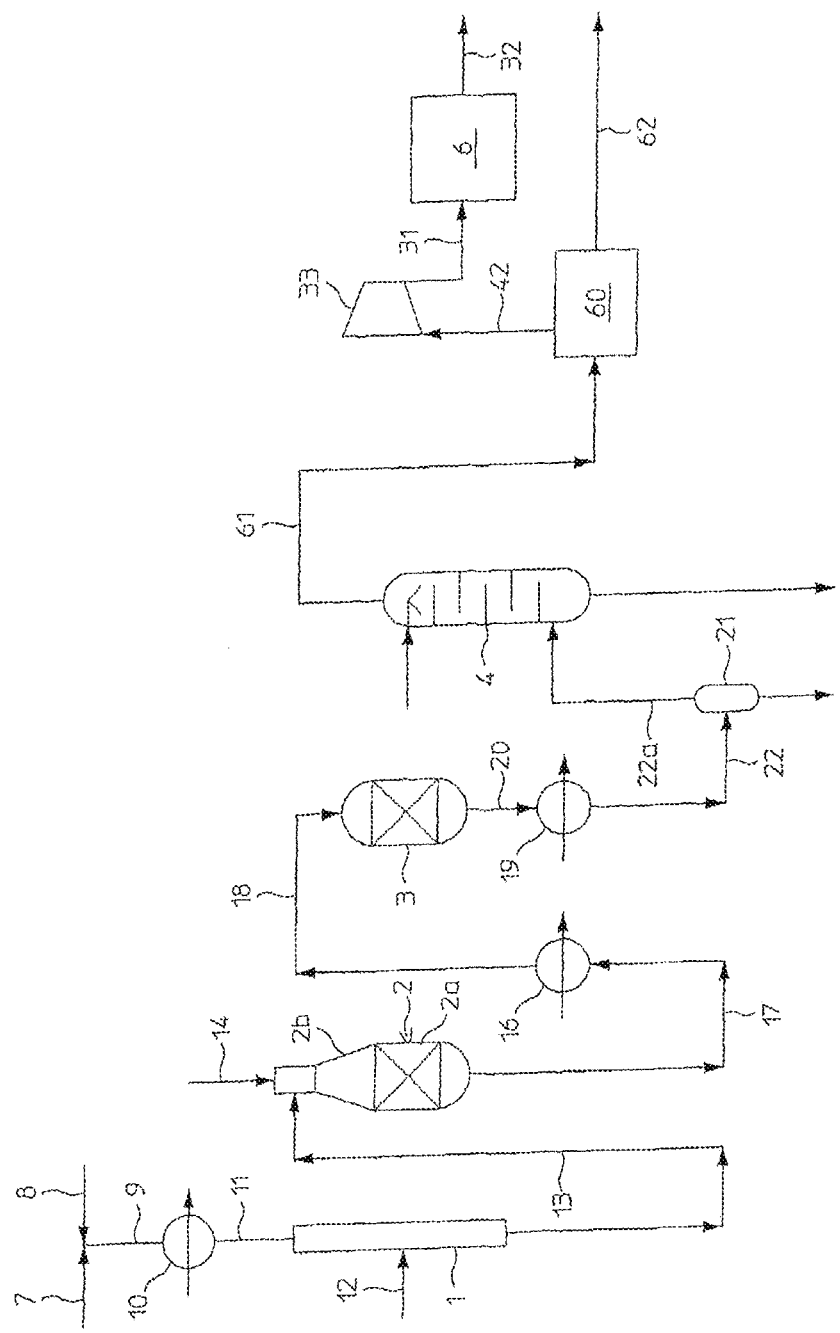
FIG. 2 shows schematically a plant for producing ammonia synthesis gas according to another embodiment of the present invention, said plant being shown in fluid communication with a ammonia synthesis loop of a ammonia plant.

FIG. 2 shows schematically a plant for producing ammonia synthesis gas according to another embodiment of the present invention.

To the elements of the plant of FIG. 2 which are identical or equivalent to corresponding elements of the plant of FIG. 1 described above will be attributed the same reference numbers of the latter and will not be further described.

As can be seen from FIG. 2, this plant differs from the plant of FIG. 1 described above in that it includes a separator 60 having a molecular sieve of the PSA or TSA type in place of the cryogenic separator 40.

In addition, the separator 60 receives directly, through the flow line 61, the gaseous mixture exiting the washing column 4 for carbon oxides and excess nitrogen separation. As a result, the methanator reactor 5 and the related equipments are not necessary anymore so obtaining a semplication of the plant and a reduction of the investment, maintenance and operating costs.

In this separator 60, carbon oxides and excess nitrogen are preferentially adsorbed in the micropores of the molecular sieve according to the PSA or TSA procedure so obtaining a ammonia synthesis gas comprising nitrogen and hydrogen in an appropriate molar ratio for ammonia synthesis (i.e. a H2/N2 molar ratio corresponding or close to 3:1) and a separated gas.

The separated gas is recovered from the separator 60 through the flow line 62 during the regeneration step of the molecular sieve (according to the PSA or TSA procedure described above) and is normally used as supplementary fuel while the ammonia synthesis gas is fed to a compressor 33 (through the flow line 42) where it is compressed to the pressure required for ammonia synthesis for example 150 bar.

Still referring to FIG. 2, further embodiments can provide one or more intermediate equipments (e.g. a heat exchanger or a compressor) along line 61, between column 4 and separator 60, according to the needs and to known technique.

According to a still further embodiment of the present invention, a pre-reformer is provided downstream to the primary reformer 1. Such a pre-reformer, which is per-se of conventional type and thus it is not shown in FIG. 1 or 2, is operated in an adiabatic manner, i.e. without heat exchange. The pre-reformer is fed with the flow of natural gas 7 and part of the steam flow 8. In the pre-reformer, a gas flow comprising hydrocarbons is obtained, which is fed, together with the remaining part of the steam flow 8, to the primary reformer 1.

Of course, a man skilled in the art can bring numerous modifications and alternatives to the process according to the invention, all of which are covered by the scope of protection of the following claims.

The invention claimed is:

1. A process for producing ammonia synthesis gas, comprising the steps of:
    feeding a gas flow comprising hydrocarbons and a gas flow comprising steam to a primary reformer equipped with a plurality of externally heated catalytic tubes,
    reacting said hydrocarbons with said steam in the catalytic tubes of said primary reformer at an operating pressure of more than 35 bar in the catalytic tubes, obtaining a product gas,
    feeding said product gas and a flow of air to a secondary reformer in the absence of added hydrocarbons, said air being added in excess over the nitrogen amount required for ammonia synthesis for reforming all the hydrocarbons content of said product gas exiting the primary reformer,
    subjecting said product gas to reaction with said air and then to secondary reforming, obtaining a reformed gas comprising nitrogen in excess over the amount required for ammonia synthesis, hydrogen, carbon oxides and unreacted steam, and removing carbon oxides and excess nitrogen from said reformed gas to obtain said synthesis gas, wherein the outlet temperature of said gas product from the tubes of the primary reformer does not exceed 750° C. so as to increase the lifetime of said tubes;

wherein said step of removing carbon oxides and excess nitrogen from said reformed gas comprises the following operative stages:

removing carbon monoxide from said reformed gas by catalytic conversion with unreacted steam into carbon dioxide and hydrogen, removing carbon dioxide by scrubbing said reformed gas with a solution or solvent after said step of carbon monoxide removal, so obtaining a reformed gas still including carbon oxides, and one of:

removing said carbon oxides from said reformed gas containing them by catalytic conversion to methane, obtaining a reformed gas deprived of carbon oxides, and removing excess nitrogen from said reformed gas deprived of carbon oxides by cryogenic separation; and removing said carbon oxides and said excess nitrogen by passing said reformed gas still including carbon oxides through a PSA or TSA molecular sieve.

2. The process according to claim 1, wherein said excess of air is comprised in the range of 15% to 100% over the air amount necessary to produce the nitrogen content required for ammonia synthesis.

3. The process according to claim 1, wherein said operating pressure in the catalytic tubes of the primary reformer is in the range of 40-100 bar.

4. The process according to claim 3, wherein said operating pressure in the catalytic tubes of the primary reformer is about 60 bar and wherein said outlet temperature is in the range of 650-750° C.

5. A process for producing ammonia from gas synthesis, comprising the steps of:

feeding a gas flow comprising hydrocarbons and a gas flow comprising steam to a primary reformer equipped with a plurality of externally heated catalytic tubes, reacting said hydrocarbons with said steam in the catalytic tubes of said primary reformer at an operating pressure of more than 35 bar in the catalytic tubes, obtaining a product gas, feeding said product gas and a flow of air to a secondary reformer in the absence of added hydrocarbons, said air being added in excess over the nitrogen amount required in the final synthesis gas for ammonia synthesis for reforming all the hydrocarbons content of said product gas exiting the primary reformer, subjecting said product gas to reaction with said air and then to secondary reforming, obtaining a reformed gas comprising nitrogen in excess over the amount required for ammonia synthesis, hydrogen, carbon oxides and unreacted steam, removing carbon oxides excess nitrogen from said second reformed gas to obtain said synthesis gas, and feeding said synthesis gas to a ammonia synthesis loop and reacting it under conditions effective to obtain ammonia, wherein the outlet temperature of said gas product from the tubes of the primary reformer does not exceed 750° C.

6. The process according to claim 5, wherein said step of removing carbon oxides and excess nitrogen from said reformed gas comprises the following operative stages:

removing carbon monoxide from said reformed gas with unreacted steam by catalytic conversion into carbon dioxide and hydrogen, removing carbon dioxide by scrubbing said reformed gas with a solution or solvent after said step of carbon monoxide removal, so obtaining a reformed gas still including carbon oxides, removing said carbon oxides from said reformed gas containing them by catalytic conversion to methane, obtaining a reformed gas deprived of carbon oxides, and removing excess nitrogen from said reformed gas deprived of carbon oxides by cryogenic separation.

7. The process according to claim 5, wherein said step of removing carbon oxides and said excess nitrogen from said reformed gas comprises the following operative stages:

removing carbon monoxide from said reformed gas by catalytic conversion with some unreacted steam into carbon dioxide and hydrogen, removing carbon dioxide by scrubbing said reformed gas with a solution or solvent after said step of carbon monoxide removal, so obtaining a reformed gas still including carbon oxides, removing said carbon oxides and said excess nitrogen by passing said reformed gas still including carbon oxides through a PSA or TSA molecular sieve.

8. The process according to claim 2, wherein said excess of air is comprised in the range of 20% to 40% over the air amount necessary to produce the nitrogen content required for ammonia synthesis.

9. The process according to claim 3, wherein said operating pressure in the catalytic tubes of the primary reformer is in the range of 60-80 bar.

* * * * *